Sept. 27, 1960

S. A. RAINS 2,953,939

TRANSMISSION

Filed Dec. 28, 1956

INVENTOR.
Sidney A. Rains
BY W. C. Middleton
ATTORNEY

United States Patent Office 2,953,939
Patented Sept. 27, 1960

2,953,939

TRANSMISSION

Sidney A. Rains, Speedway City, Ind., assignor to General Motors Corporation, Detroit, Mich., a corporation of Delaware Filed Dec. 28, 1956, Ser. No. 631,201

11 Claims. (Cl. 74—606)

This invention relates to a fluid chamber filling and venting system and more particularly to a filling venting system for the housing of a machine having a large body of rotating fluid such as a hydrodynamic brake or a fluid drive.

In fluid chambers of machine housings having a filling and liquid level measuring tube connected to the sump portion of the machine chamber below the normal liquid level and an air vent at the top of the chamber in the housing, rapid changes in the air pressure within the chamber will with a small air vent opening cause objectionable surges which may spill oil out through the filler tube or with a large vent pass objectionable quantities of oil with the air through the vent opening. These changes of pressure or the volume of air in the machine chamber are caused by filling of the chamber, rapid temperature changes, or certain conditions of operation of the machine. Hydrodynamic brakes create a critical situation of this nature. When a hydrodynamic brake is released there is a rather large and sudden increase in pressure of the air in the machine chamber, and thus a large flow through the air vent. This is believed to be caused by the compression of air in the oil in the brake or torque transmitting chamber during the operation of the hydrodynamic brake and the release of the air on the release of the hydrodynamic brake by the evacuation of the oil from the brake chamber to the machine chamber. Fluid drives; such as, torque converters and fluid couplings create a similar though less severe condition on the return of fluid from the torque transmitting chamber to the machine chamber. In order to solve this problem I have connected the machine chamber air vent passage to the machine chamber filler tube at a point substantially above the liquid level and substantially below an outlet orifice adjacent the upper end of the tube. The machine chamber is thus vented through the air vent passage, filler tube and outlet vent orifice to atmosphere. The air vent line is of sufficient size relative to the small outlet vent orifice so that it will convey a sufficient volume of air to the filler tube to increase the pressure in the filler tube sufficiently to prevent the air pressure in the machine chamber forcing oil out through the filler tube and vent orifice. Since the air vent passage is substantially smaller than the filler tube passage the reduction in speed of flow of the air and the change in direction in the filler tube separates the oil from the air permitting the oil to flow down and return to the sump and the air passes upwardly through the filler tube and outlet orifice to atmosphere.

An object or the invention is to provide a simplified filling and venting system which will separate the fluid from the air passing through the vent and return the fluid to the sump.

Another object of the invention is to provide in a machine sump for a machine having a large body of rotating fluid, a dip stick and filler tube, a vent connection from the top of the housing to the filler tube above the fluid level and below an outlet orifice at the top of the filler tube to separate the fluid from the air, to return the fluid down through the tube to the sump and to pass the air up through the tube through the orifice to atmosphere.

Another object of the invention is to provide a filling and venting system having a filler tube connected below the liquid level and extending substantially above the liquid level, a vent connected from the top of the chamber to a central portion of the filler tube between the liquid level and the orifice so that the vent passage will create a pressure on the fluid in the filler tube to balance the increased pressure in the chamber acting on the oil to prevent surges of fluid out of the filler tube.

These and other objects of the invention will be more apparent from the following description and drawing of preferred embodiments of the invention.

Figure 1:
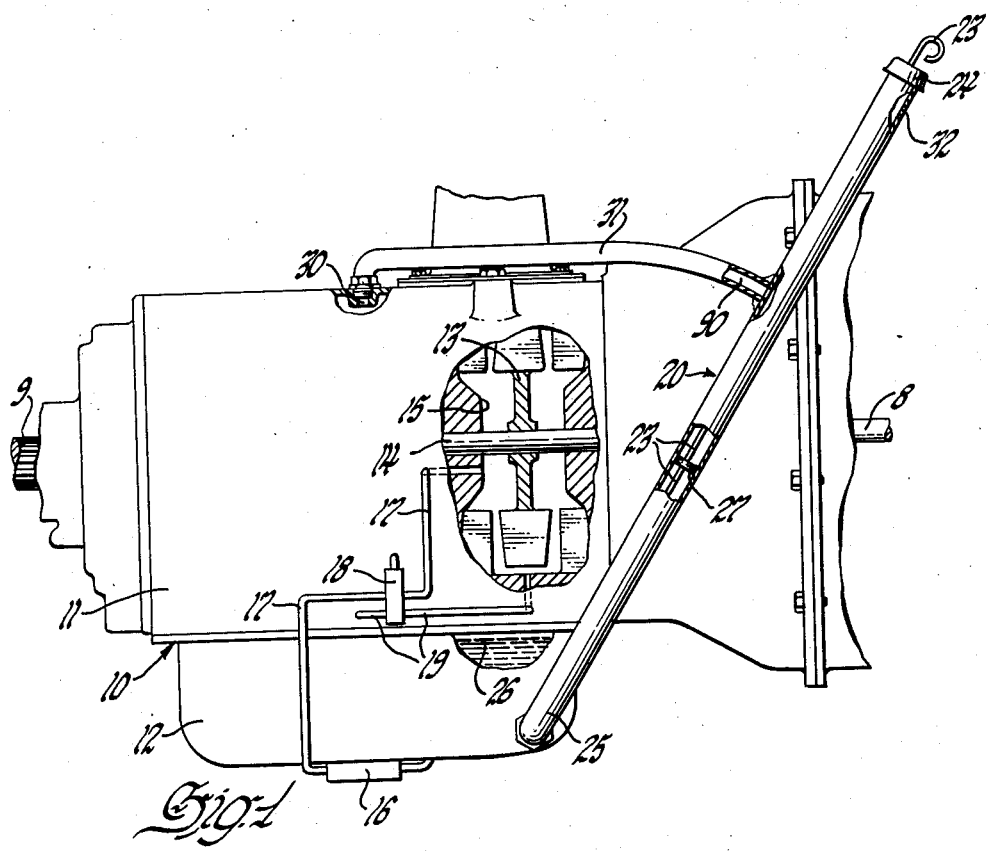
Figure 1 shows a vent and filler system applied to a machine.

The invention is illustrated as applied to a machine housing having a hydrodynamic brake where there is a substantial and rapid increase in the pressure of the air in the machine housing or chamber when the hydrodynamic brake is released. During the operation of the rotary machine wherein a body of fluid is turbulently rotated such as in a hydrodynamic brake, torque converter or a fluid coupling, air is apparently compressed in the fluid during the operation of these devices. Then on the release or discontinuance of the operation of these devices, the air is decompressed and released from the fluid and consequently increases the pressure in the machine chamber. It is proposed to relieve this pressure gradually to eliminate carrying undesirable quantities of fluid such as oil out of the machine through the air vent, to eliminate the need for large volume separation equipment to remove the oil from the air flowing out of the vent, and to eliminate the possibility of accumulated air pressure in the chamber forcing fluid out of the filler tube.

The applicant's invention is specifically illustrated as applied to a transmission 10 of the type shown in application S.N. 554,866 filed December 22, 1955 and having a transmission housing or machine chamber 11, with a sump portion 12. The transmission has an input shaft 8 and an output shaft 9 connected by ratio change mechanism, incorporating a hydrodynamic brake, or a torque converter or a fluid coupling located in a separate fluid torque transmitting chamber which on the return of fluid to the machine chamber create rapid and substantial changes in the air pressure within the machine chamber or in the volume of air required within the machine chamber. The drawing illustrates a hydrodynamic brake having a bladed rotor 13 fixed to an intermediate shaft 14 in the transmission for rotation in the internally bladed brake or torque transmitting chamber 15 which acts as a stator. A pump 16 supplies fluid from the sump 12 portion of machine chamber 11 to an inlet line 17 which is connected through the valve 18 to the brake chamber 15. An outlet line 19 connects the chamber through the valve 18 to the sump 12. In the brake on position the valve 18 opens the inlet line to connect the pump to the brake chamber and closes the outlet line to fill the brake chamber to apply the brake. In the brake off position the inlet line is closed and the outlet line opened to connect the brake chamber to the sump 12 of machine chamber 11 to empty the brake chamber. The brake chamber is not otherwise connected to the transmission housing.

The transmission housing has a filler tube 20 having an elbow 25 at the lower end connecting the filler tube to the lower portion of the transmission sump 12 portion of machine chamber 11. A dip stick 23 having fixed thereto a cap 24 is normally employed in the filler tube to measure the liquid level in the transmission. The normal liquid level in the transmission housng or chamber and the filler tube is generally at the lower portion of the filler tube as indicated at 26. A few inches above the liquid level a washer 27 is fixed to the dip stick 23 providing a baffle to prevent surges of fluid from moving rapidly up through the filler tube, however there is a clearance around the washer 27 to permit air and a limited quantity of fluid to pass around the washer so that the washer 27 does not interfere with the flow of a limited volume of oil or with the removal of the dip stick tube during the measuring operation.

The transmission housing or machine chamber 11 has a vent opening 30 at or adjacent the top which is connected by a conduit 31, the filler tube 20 and then connected to atmosphere through the orifice 32 in the side wall of the top of the filler tube 20. This orifice 32 may be alternatively placed in the filler tube cap 24 or provided by a clearance between the cap and the vent tube. The orifice 32 provides the only connection to atmosphere since the other elements of the system; the chamber, the tube, and the vent passage, though interconnected, are otherwise closed or sealed.

When due to an increase in the air volume in transmission housing 11 the air pressure increases and causes a fluid pressure rise in the transmission housing including the interconnected chamber 11 and sump 12 the liquid level in the filler tube 20 will immediately tend to rise. However the size of the air vent 30 is just sufficiently large so that it quickly passes a sufficient volume of air through the vent opening 30 and passage 31 to the upper portion of the filler tube 20 to increase the pressure therein, in conjunction with the continuous outlet air flow through the smaller sized orifice 32, to limit the air pressure created fluid rise to a point generally below the washer 27 and always below the connection from the conduit 31 to the tube 20. The washer 27 will momentarily delay a surge of fluid passing up in the tube 20 due to an increase in pressure in the transmission chamber to permit the air venting through the vent opening 30 and passage 31 to build up a sufficient pressure in the upper portion of the tube 20 to limit the air pressure created fluid rise. The air passing through the passage 31 carries with it a considerable quantity of oil and thus it is preferred to generally slope the passage 31 toward the filler tube 20 so that the oil dropped in this passage will flow with the fluid to prevent the air again picking up the oil dropped in the passage. The passage 31 is also connected substantially at right angles to the tube 20 so that the fluid or oil is separated from the air both due to the sudden change in the direction of flow of air and the reduction in the speed of flow of air which occurs when the air passes through the small passage 31 to the larger tube 20. This together with the cooling effect of the air flowing up through the tube 20 separates the fluid from the air and substantially clean air is passed out of the orifice 32. The dip stick 23 is a flat strip of less width than the internal diameter of the tube 20 and thus readily permits communication between portions of the tube on both sides of the dip stick. The dip stick may be positioned so that the section thereof is aligned with or transverse to the axis of passage 31 so that the air flowing into the tube 20 would impinge on the dip stick and the fluid therein will wet the dip stick and flow downwardly while the air would flow around the stick and up through the tube 20.

Figure 2:
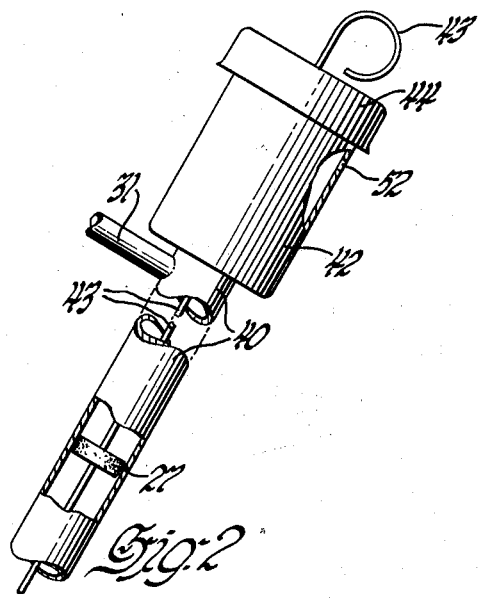
Figure 2 shows a modification.

In a modification shown in Figure 2 the upper portion of tube 40 is enlarged at 42 to provide a larger volume chamber. The air vent passage 31 is connected to the narrow portion of tube 40 providing a quick change in the direction of flow of air and then moves at a slow rate through the larger portion of chamber 42 to remove the fluid out through the orifice 52. A dip stick 43 attached to a cap 44 may also be used and the cap 44 may be indexed on the tube to position it transversely to the vent passage 31.

The above described preferred embodiments of the invention are illustrative of the invention and may be modified by those skilled in the art within the scope of the appended claims.

I claim:

1. In power drive control apparatus of the character described; a housing having a chamber; power drive control apparatus in said chamber employing liquid in the operation of said apparatus and producing heat during operation of said apparatus; said chamber being filled with liquid to a substantially horizontal intermediate normal liquid level and having an air space above said normal liquid level during all phases of normal operation of said apparatus; a fluid passage connected at one end to said chamber only below said normal liquid level; the other end of said fluid passage extending above the said normal liquid level and having a closure portion, an air vent passage connecting said chamber at all times from a point in said air space above said normal liquid level to said fluid passage at a point above said normal liquid level having a large size and flow capacity to provide for rapid air flow from said air space in said chamber to said fluid passage without significant reduction of air pressure; vent orifice means in said fluid passage above said normal liquid level; said chamber, fluid passage and air vent passage being otherwise closed; and said vent orifice means having a sufficiently smaller size and flow capacity than said air vent passage size and flow capacity to, on an increase in air pressure in said chamber providing a surge of air passing through said air vent passage, temporarily create air pressure in said fluid passage above said normal liquid level to balance the air in said chamber to prevent the surging of liquid up through said fluid passage and out through said vent orifice means due to an increase in air pressure in said chamber above said liquid level.

2. In power drive control apparatus of the character described; a housing having a chamber; power drive control apparatus in said chamber employing liquid in the operation of said apparatus and producing heat during operation of said apparatus; said chamber being filled with liquid to a substantially horizontal intermediate normal liquid level during all phases of normal operation of said apparatus; a fluid passage connected at one end to said chamber only below said normal liquid level and the other end extending above said normal liquid level; said fluid passage having a closure portion sealing said other end of said fluid passage; an air vent passage connecting said chamber from a point always above said normal liquid level to said fluid passage at a point always above said normal liquid level having a predetermined size and air flow capacity; vent orifice means in said fluid passage longitudinally spaced above said point of connection to said vent passage; said interconnected chamber, fluid passage and air vent passage being otherwise unvented to atmosphere; and said vent orifice means having a sufficiently smaller size and air flow capacity than said air vent passage size and air flow capacity to, on an increase in air volume and air pressure in said chamber providing a surge of air passing through said air vent passage, temporarily create air pressure in said fluid passage above said normal liquid level to balance the air pressure in said chamber to prevent the surging of liquid up through said fluid passage and out through said vent orifice means due to an increase in air pressure in said chamber above said normal liquid level.

3. In power drive control apparatus of the character described; a housing having a chamber; power drive control apparatus in said chamber employing liquid in the operation of said apparatus and producing heat during operation of said apparatus; said chamber being filled with liquid to a substantially horizontal intermediate normal liquid level during normal operation of said apparatus; a fluid passage connected at one end to the chamber only below said normal liquid level and the other end extending above said normal liquid level; said fluid passage having a closure portion sealing said other end of said fluid passage; an air vent passage connecting said chamber from a point above said normal liquid level to said fluid passage at a point above said normal liquid level having a large size and flow capacity to provide for rapid air flow from said chamber to said fluid passage without significant reduction of air pressure; said vent passage being connected perpendicularly to said fluid passage and said fluid passage having means located close to said air vent passage connection to require a sharp change in the direction of the flow of the air flowing from said air vent passage into said fluid passage to separate the liquid from the air; vent orifice means in said fluid passage above said normal liquid level longitudinally spaced from said point of connection to said vent passage; said fluid passage having a substantially larger size than said air vent passage so that the air flows through said fluid passage slower than through said air vent passage to assist in the separation of liquid from the air; and said vent orifice means having a sufficiently smaller size and flow capacity than said air vent passage size and flow capacity to, on an increase in air pressure in said chamber providing a surge of air passing through said air vent passage, temporarily create a pressure in said fluid passage to balance the air pressure in said chamber to prevent the surging of liquid up through said fluid passage and out through said vent orifice means due to an increase in air pressure in said chamber above said normal liquid level.

4. In a vent system for apparatus of the character described; a chamber having, when operating, liquid therein at a substantially horizontal intermediate liquid level during all phases of all normal operation of the apparatus; a fluid passage connected to the chamber at one end only below the liquid level and the other end of said fluid passage extending above the liquid level; a vent passage connecting said chamber from a point above the liquid level to said fluid passage at a point above the liquid level; vent orifice means in said fluid passage above said liquid level connecting the interior of said fluid passage to atmosphere; said chamber and vent passage and fluid passage being sealed except for said vent orifice means; and said vent orifice means having a sufficiently smaller size and air flow capacity than said vent passage size and air flow capacity to, on an increase in air pressure in said chamber providing a surge of air passing through said air vent passage, temporarily create air pressure in said fluid passage to balance the air pressure in said chamber to prevent liquid surges up through said fluid passage and out through said vent orifice means due to an increase in air pressure in said chamber above said liquid level.

5. In a vent system for apparatus of the character described; a chamber filled with liquid to a substantially horizontal intermediate level during all phases of normal operation of the apparatus; a fluid passage through which liquid may flow connected at one end to the chamber only below the liquid level and the other end extending above the liquid level; an air vent passage connecting said chamber from a point above said liquid level to said fluid passage at a point above said liquid level; vent orifice means in said fluid passage above said liquid level connecting the interior of said tube to atmosphere; said chamber and vent passage and fluid passage being sealed except for said vent orifice means; and said vent orifice means having a sufficiently smaller air flow capacity than said vent passage air flow capacity to, on an increase in air pressure in said chamber providing a surge of air passing through said air vent passage to temporarily create air pressure in said fluid passage above said liquid level, balance the air pressure in said chamber to prevent liquid surges up through said fluid passage and out through said vent orifice means due to an increase in air pressure in said chamber above said liquid, and a baffle in said fluid passage restricting and delaying the flow of liquid through said fluid passage located below said point of connection between said air vent passage and said fluid passage to insure that said surge of air reaches said fluid passage before the liquid level rises above said last mentioned point of connection.

6. In apparatus of the character described; a torque transmitting chamber having relatively rotatable bladed members therein for transmitting torque; a machine chamber having a sump filled with liquid to a normal substantially horizontal intermediate liquid level and having air above said liquid level during all phases of normal operation of the apparatus; means to supply liquid from said sump to fill said torque transmitting chamber and to return liquid from said torque transmitting chamber to said sump to empty said torque transmitting chamber; a fluid passage having one end connected to said sump only below said liquid level and the other end extending above said liquid level; an air vent passage connecting said machine chamber from a point above said liquid level to said fluid passage at a point above said liquid level; air vent orifice means in said fluid passage above said liquid level, said machine chamber, air vent passage, and tube being otherwise closed; and said air vent orifice means having a sufficiently smaller size and flow capacity than said vent passage size and flow capacity to, on an increase in air pressure in said chamber providing a surge of air passing through said air vent passage, temporarily create air pressure in said fluid passage to balance the air pressure in said sump to prevent the surging of liquid up through said fluid passage and out through said vent orifice means due to an increase in air pressure in said machine chamber above said liquid.

8. In apparatus of the character described; a chamber filled with liquid to a normal substantially horizontal intermediate liquid level during operation of the apparatus; a fluid passage connected at one end to said chamber only below said liquid level and the other end extending above said liquid level; an air vent passage connecting said chamber from a point above said liquid level to said fluid passage at a point above said liquid level; vent orifice means in said fluid passage above said liquid level longitudinally spaced from said point of connection to said vent passage; said fluid passage being otherwise closed at the upper end and having an enlarged portion between said point of connection to said vent passage and said orifice means; and said vent orifice having a sufficiently smaller flow capacity than said vent passage to, on an increase in air pressure in said chamber providing a surge of air passing through said air vent passage, temporarily create air pressure in said fluid passage above said liquid level to balance the air pressure in said chamber to prevent liquid surges up through said fluid passage and out through said vent orifice means due to an increase in air pressure in said chamber above said liquid.

9. In apparatus of the character described; a chamber having a sump portion with liquid therein at an intermediate substantially horizontal liquid level during all phases of normal operation of the apparatus; a filler passage having a lower end connected to said sump only below said level of the liquid and an uper end located substantially above said level of the liquid; said filler passage having a removable closure at said upper end; a measuring stick extending through said removable closure and into said filler passage below the level of said liquid; an air vent passage connecting said chamber and said filler tube above said liquid level; a vent orifice adjacent the upper end of said filler passage admitting air to said filler passage, air vent passage and chamber above said liquid level and having a smaller flow capacity than said vent passage to provide a reduced flow capacity to, on an increase in air pressure in said chamber providing a surge of air passing through said air vent passage, temporarily create air pressure in said filler passage to substantially balance the air pressure acting on the liquid within said chamber to prevent air pressure in said chamber forcing liquid out through said filler passage and vent orifice due to an increase in air pressure in said chamber above said liquid level; and said chamber, filler passage and air vent passage being otherwise closed.

10. In apparatus of the character described; a chamber having a sump portion with liquid therein at a substantially horizontal intermediate liquid level during all phases of normal operation of the apparatus; a filler passage having a lower end connected to said sump only below said level of the liquid and an upper end located substantially above said level of the liquid; a closure on said upper end; a measuring stick extending into said filler passage below the level of the fluid; an air vent passage connecting the top of said chamber to a connection entering said filler passage both at a point above said level of the liquid; said measuring stick having a flat portion located closely adjacent said point at which the vent passage is connected to said filler passage to sharply change the direction of flow of the air to separate liquid from the air; a vent orifice adjacent the upper end of said filler passage admitting air to said filler passage, air vent passage and chamber above said liquid level and having a smaller flow capacity than said air vent passage to, on an increase in air pressure in said chamber providing a surge of air passing through said air vent passage, temporarily create air pressure in said filler passage to substantially balance the air pressure acting on the liquid within said chamber to prevent air pressure in said chamber forcing liquid out through said filler passage due to an increase in air pressure in said chamber above said liquid level.

11. In an apparatus of the character described; a chamber having a sump portion with liquid therein at an intermediate substantially horizontal liquid level during all normal operation of the apparatus; a filler passage having a lower end connected to said sump only below the level of the liquid and an upper end located substantially above the level of the liquid; a closure on said upper end of said filler passage; a measuring stick secured to said cap and extending in said filler passage below the level of the liquid; an air vent passage connecting the top of said chamber to a connection entering said filler passage perpendicularly at a point above the level of the liquid and substantially below said upper end of said filler passage; and a vent orifice adjacent the upper end of said filler passage admitting air to said filler passage, air vent passage and chamber above said liquid level and having a smaller flow capacity than said vent passage to provide a reduced flow capacity to, on an increase in air pressure in said chamber providing a surge of air passing through said air vent passage, temporarily create air pressure in said filler passage to substantially balance the air pressure acting on the liquid within said chamber to prevent air pressure in said chamber forcing liquid out through said filler passage due to an increase in air pressure in said chamber above said liquid level.

12. In apparatus of the character described; a chamber having a sump portion with liquid therein at an intermediate substantially horizontal liquid level during all normal phases of operation of the apparatus; a filler passage having a lower end connected to said sump only below said level of the liquid and an upper end located substantially above said level of the liquid; a closure on said upper end of said filler passage; a measuring stick secured to said cap and extending in said filler passage below said level of the liquid; an air vent passage connecting the top of said chamber to a connection entering said filler passage perpendicularly at a point above said level of the liquid and substantially below said upper end of said filler passage; a vent orifice adjacent the upper end of said filler passage admitting air to said filler passage, air vent passage and chamber above said liquid level and having a smaller flow capacity than said vent passage to provide a reduced flow capacity to, on an increase in air pressure in said chamber providing a surge of air passage through said air vent passage, temporarily create air pressure in said filler passage to substantially balance the air pressure acting on the liquid within said chamber to prevent air pressure in said chamber forcing liquid out through said filler passage due to an increase in air pressure in said chamber above said liquid level; and a baffle on said measuring stick located below the said vent passage connection to said filler passage to retard and delay liquid flow through said filler passage.

References Cited in the file of this patent
UNITED STATES PATENTS

| Number | Name | Date |
|---|---|---|
| 1,354,788 | Wallace | Oct. 5, 1920 |
| 1,658,774 | Taub | Feb. 7, 1928 |
| 1,717,188 | Ciomei | June 11, 1929 |
| 1,985,889 | DeLaMater et al. | Jan. 1, 1935 |

UNITED STATES PATENT OFFICE
CERTIFICATE OF CORRECTION

Patent No. 2,953,939                      September 27, 1960

Sidney A. Rains

It is hereby certified that error appears in the printed specification of the above numbered patent requiring correction and that the said Letters Patent should read as corrected below.

Column 4, line 30, after "air" insert -- pressure --; column 5, line 60, for "tube" read -- fluid passage --; columns 6, 7 and 8, for the claims now numbered "8", "9", "10", "11" and "12", respectively, read -- 7, 8, 9, 10 and 11 --; column 8, line 28, for "passage" read -- passing --.

Signed and sealed this 11th day of April 1961.

(SEAL)
Attest:

ERNEST W. SWIDER
Attesting Officer

ARTHUR W. CROCKER
Acting Commissioner of Patents